United States Patent [19]
Chen et al.

[11] Patent Number: 6,002,289
[45] Date of Patent: Dec. 14, 1999

[54] VOLTAGE PEAK SWITCH CLOSING METHOD FOR SHUNT CAPACITOR ENERGIZATION

[76] Inventors: Nanming Chen, 32, Trinity, Irvine, Calif. 92612; Kuo-Chi Lui, No. 91, Lin 9, Hsi-Tsun, Pao-Shan Hsiang, Hsinchu Hsien, Taiwan

[21] Appl. No.: 08/829,425

[22] Filed: Mar. 31, 1997

[51] Int. Cl.$^6$ .................................................. H03K 5/08
[52] U.S. Cl. ........................................ 327/310; 307/128
[58] Field of Search .................................. 327/309, 310, 327/78, 79; 323/901, 908; 307/108, 109, 128, 130

[56] References Cited

U.S. PATENT DOCUMENTS

3,676,734  7/1972  Shimizu et al. .................... 315/200
4,890,213  12/1989  Seki .................................... 363/49

*Primary Examiner*—Kenneth B. Wells
*Attorney, Agent, or Firm*—Pillsbury Madison & Sutro, LLP

[57] ABSTRACT

When energizing a shunt capacitor in a circuit that includes an ac power supply and a switch, the shunt capacitor is initially precharged to a predetermined voltage with a direct current voltage. Thereafter, the switch is closed at an instant of voltage peak of the ac power supply with the same polarity as the predetermined voltage.

10 Claims, 14 Drawing Sheets

| CONTROL STRATEGY | PRECHARGED VOLTAGE | SWITCH CLOSE TIME | CAPACITOR CURRENT AND VOLTAGE |
|---|---|---|---|
| VOLTAGE ZERO CLOSING | $v_c(0)=0$ | $\alpha=0°$ | $\hat{i}(t)=I_m\cos\omega t - I_m\cos\omega_n t$ <br> $v_c(t)=\hat{V}_m\sin\omega t - \frac{1}{n}\hat{V}_m\sin\omega_n t$ |
| TRANSIENT-FREE SWITCHING | $v_c(0)=\hat{V}_m$ | $\alpha=90°$ | $\hat{i}(t)=I_m\cos(\omega t+90°)$ <br> $v_c(t)=\hat{V}_m\sin(\omega t+90°)$ |
| VOLTAGE PEAK CLOSING | $v_c(0)=V_m$ | $\alpha=90°$ | $\hat{i}(t)=I_m\cos(\omega t+90°)+n[\frac{\hat{V}_m-V_m}{X_c}]\sin\omega t$ <br> $v_c(t)=\hat{V}_m\sin(\omega t+90°)+[V_m-\hat{V}_m]\cos\omega_n t$ |

VOLTAGE PEAK SWITCH CLOSING METHOD FOR SHUNT CAPACITOR ENERGIZATION

BACKGROUND OF THE INVENTION

1. Field of the Invention

This invention relates to a method for energizing a shunt capacitor, more particularly to a voltage peak switch closing method for shunt capacitor energization.

2. Description of the Related Art

In an alternating voltage system, the magnitude of an instantaneous voltage varies with time. Since the phase of capacitor current leads the capacitor voltage by 90 degrees in steady state, the current peak appears at voltage zero while the current zero appears at voltage peak. Therefore, shunt capacitor energization often encounters the problem of inrush current and transient overvoltage. The voltage surge even occurs at remote locations with a capacitive load.

Figure 1:
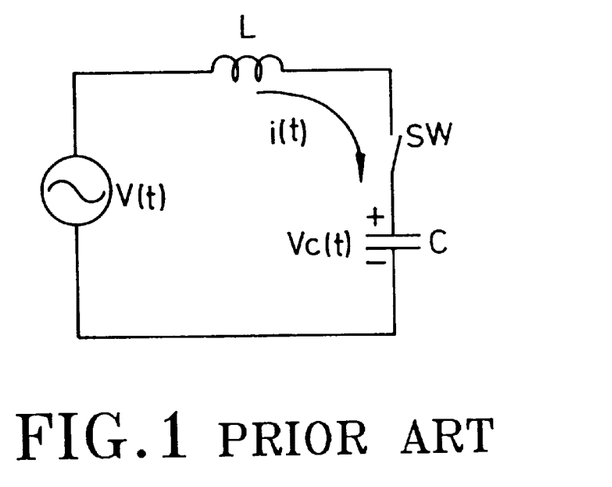
FIG. 1 is a schematic circuit diagram illustrating a capacitor switching circuit.
Figure 2:
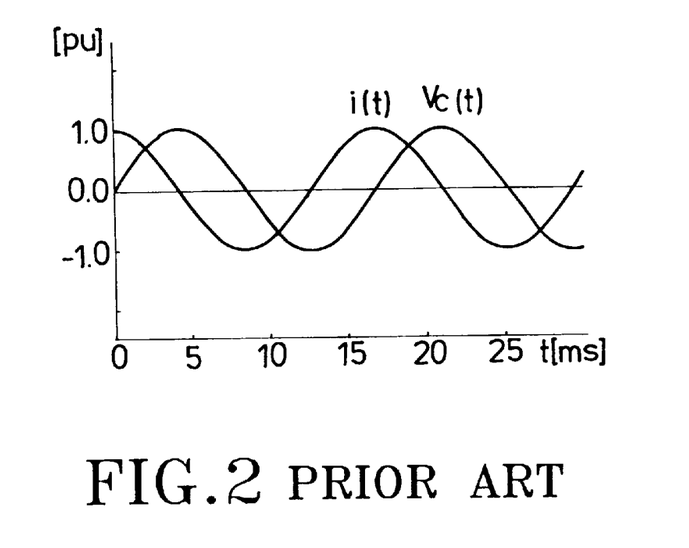
FIG. 2 is a chart illustrating voltage and current waveforms of the capacitor switching circuit of FIG. 1 in steady state.

FIG. 1 shows a capacitor switching circuit, while FIG. 2 shows capacitor voltage and current waveforms of the circuit of FIG. 1 in steady state. In order to analyze the capacitor switching circuit of FIG. 1, the Kirchhoff's Voltage Law (KVL) and Laplace Transformation were used to deal with the problem of time domain switching circuit with initial value. With a sinusoidal ac supply voltage $$V(t) = V_m \sin(\omega t + \alpha)$$

where $V_m$ is the peak value of the ac voltage. The source voltage indicates a phasor varying at the supply frequency $\omega$. The inclusion of the arbitrary phase angle $\alpha$ permits closing of the switch (SW) at any instant in the voltage cycle. When the switch (SW) is closed, the equation expressed in terms of the current is $$L[di(t)/dt] + (1/c)\int i(t)dt = V(t)$$

The current equation and voltage equation in terms of the Laplace transform are $$L[sI(s) - I(0)] + I(s)/sC + Vc(0)/s = V(s)$$

$$V(s) = V_m\{[\omega \cos\alpha/(s^2+\omega^2)] + [s \sin\alpha/(s^2+\omega^2)]\}$$

where $I(0)$ and $Vc(0)$ are the initial values of the inductor current and the capacitor voltage respectively. In this circuit, the operational solution for current is $$I(s) = \{1/[sL + (1/sC)]\}[V(s) + LI(0) - Vc(0)/s] \quad (1)$$

$$= [sV(s)/L(s^2 + \omega n^2)] + [sI(0)/(s^2 + \omega n^2)] -$$

$$[Vc(0)/L(s^2 + \omega_n^2)]$$

where $\omega_n$ is the natural frequency of the switching circuit.

$$Wn = 1/[\sqrt{(LC)}]$$

The first term on the right-hand side of equation (1) can be rewritten as follows:

$$sV(s)/L(s^2 + \omega_n^2) = [s/L(s^2 + \omega_n^2)](V_m)\{[(\omega\cos\alpha/(s^2 + \omega^2)] +$$

$$[s\sin\alpha/(s^2 + \omega^2)]\}$$

$$= (V_m/\omega L)\{[\cos\alpha/(n^2 - 1)][-s/(s^2 + \omega_n^2) +$$

$$s/(s^2 + \omega^2)] + [\sin\alpha/(n^2 - 1)][n\omega_n/(s^2 + \omega_n^2) +$$

$$-\omega/(s^2 + \omega^2)]\}$$

where n is the per unit natural frequency.

$$n = \omega_n/\omega$$

Taking the inverse Laplace transform $$L^{-1}\{sV(s)/L(s^2 + \omega_n^2)\} = (V_m/X_L) \times [(\cos\alpha/(n^2 - 1)) \times \quad (2)$$

$$[(\cos\omega t - \cos\omega_n t) + \sin\alpha/(n^2 - 1)) \times$$

$$(n\sin\omega_n t - \sin\omega t)]$$

$$= (n^2/(n^2 - 1)) \times (V_m/X_C)[\cos\omega t + \alpha) -$$

$$\cos\alpha\cos\omega_n t + n\sin\alpha\sin\omega_n t]$$

$$= \hat{I}_m\cos(\omega t + \alpha) - \hat{I}_m\cos\alpha\cos\omega_n t +$$

$$n\hat{I}_m\sin\alpha\sin\omega_n t$$

where $\hat{I}_m$ and $\hat{V}_m$ are the peak values of the capacitor current and voltage in steady state respectively.

$$\hat{I}_m = [(n^2/(n^2-1))(V_m/X_C) = \hat{V}_m/X_c$$

Equation (1) can be evaluated with the aid of equation (2).

$$i(t) = \hat{I}_m\cos(\omega t+\alpha) + [I(0) - \hat{I}_m \cos\alpha]\cos\omega_n t + n[\hat{I}_m\sin\alpha - (V_c(0)/X_c)]$$
$$\sin\omega_n t \quad (3)$$

Similarly, the capacitor voltage is derived as follows:

$$(d^2v_c(t)/dt^2) + (1/LC)v_c(t) = (1/LC)v(t)$$

By straight forward transform manipulation and inverse transformation, we get the instantaneous voltage:

$$v_c(t) = \hat{V}_m \sin(\omega t+\alpha) + [V_c(0) - \hat{V}_m\sin\alpha]\cos\omega t + (1/n)[X_cI(0) - \hat{V}_m \cos\alpha]\sin\omega_n t \quad (4)$$

Equations (3) and (4) represent the time domain response of the capacitor current and voltage in the switching circuit shown in FIG. 1. The first term is the fundamental frequency component. The second and third terms represent the oscillatory components with circuit natural frequency $\omega_n$.

The magnitude of the oscillatory components is a function of the system voltage, capacitor trapped voltage, inductor current and the switch closing time.

In general, capacitors are initially discharged $[V_c(0)=0]$. The worst case occurs at the time when a discharged capacitor is energized at the instant of voltage peak which results in a transient overvoltage near twice the normal peak voltage. If a capacitor is trapped with peak voltage $[V_c(0)=+V_m]$, the worst case occurs when the capacitor is energized at the instant of voltage peak with opposite polarity. It brings a transient overvoltage near three times the normal peak voltage.

For ideal switching, the oscillatory components of current in equation (3) [voltage in equation (4)] must be zero. This can happen only when the following two conditions are simultaneously satisfied.

$$I(0) = \hat{I}_m\cos\alpha \quad (A)$$

$$V_c(0) = \hat{V}_m \sin\alpha \quad (B)$$

A voltage zero switch closing method has been proposed for shunt capacitor energization. For a discharged capacitor, from the condition (B), the closing time is selected at voltage zero (i.e., α=0° or α=180°), so that the condition (A) will be $$I(0)=\pm \hat{I}_m \tag{5}$$

Figure 3A:
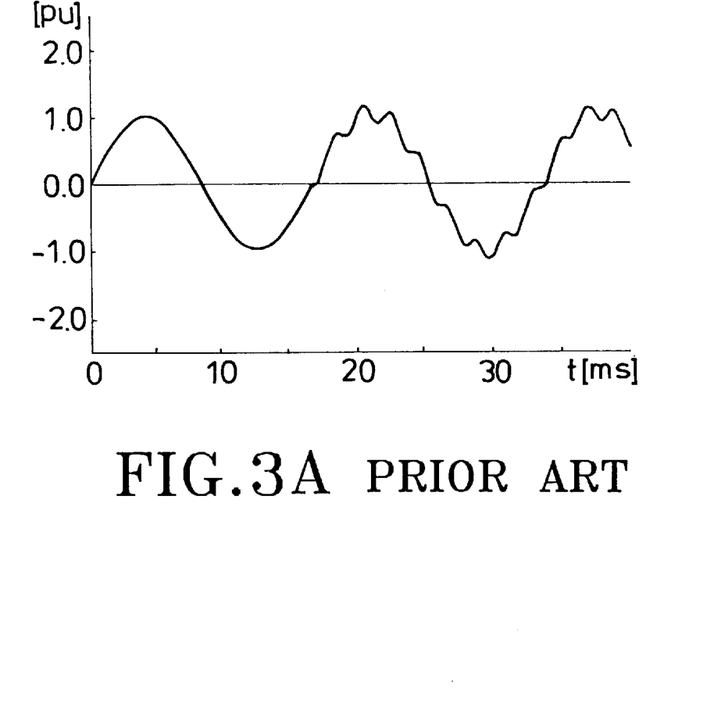
FIGS. 3A and 3B respectively illustrate waveforms of bus voltage and capacitor current when the switch is closed by the conventional voltage zero closing method.
Figure 3B:
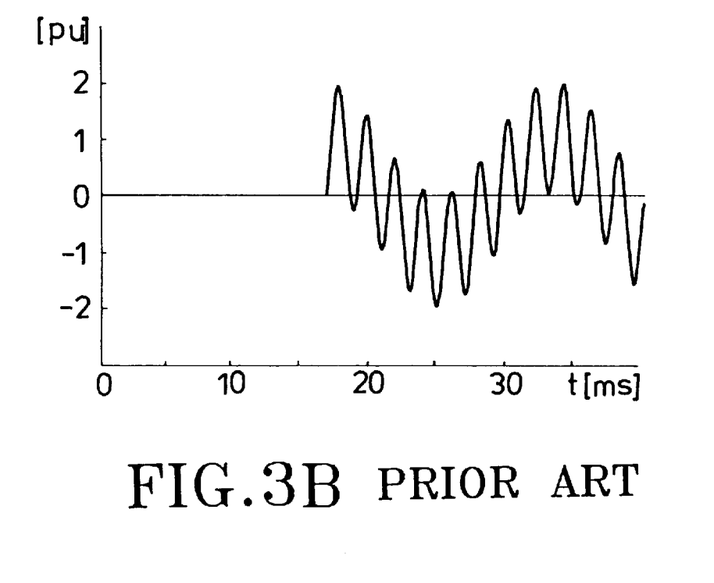

Equation (5) means that the initial value of inductor current must be equal to the peak value of the fundamental frequency capacitor current. However, it is difficult and expensive to accomplish this technique up to now. Therefore, the discharged capacitor energized by the voltage zero closing method will produce a high frequency oscillatory component due to equation (5) not being satisfied, as shown in FIGS. 3A and 3B.

Figure 4:
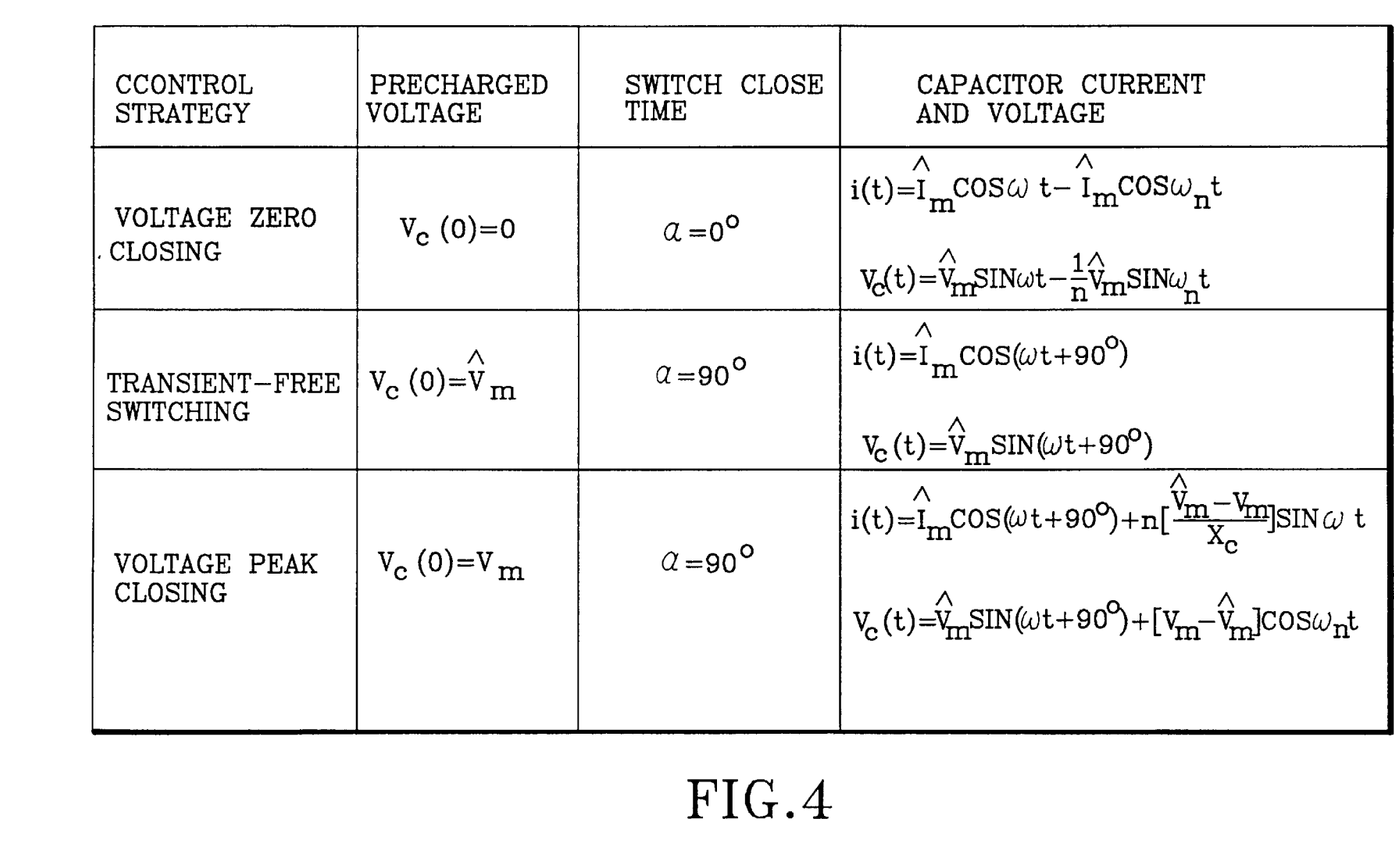
FIG. 4 is a table illustrating the relationships among the precharged voltage, the switch closing time and the capacitor current and voltage of the conventional voltage zero switch closing method for shunt capacitor energization and the voltage peak switch closing method for shunt capacitor energization according to the present invention.

The equations of capacitor current and voltage are shown in FIG. 4. The magnitude of the high frequency oscillatory current component is the same as the fundamental frequency component. The magnitude of the high frequency oscillatory voltage component is related to the fraction of the natural frequency of the switching circuit. Lower natural frequency results in a larger high frequency oscillatory component.

It should be noted that the transient overvoltage as described above damages not only the capacitor, but also the other components that are connected to the capacitor.

SUMMARY OF THE INVENTION

Therefore, the objective of the present invention is to provide a voltage peak switch closing method for shunt capacitor energization, the method being capable of adequately overcoming the aforementioned shortfalls that are associated with the prior art.

According to the present invention, a voltage peak switch closing method for energizing a shunt capacitor in a circuit that includes an ac power supply and a switch, comprises the steps of: (a) precharging the shunt capacitor to a predetermined voltage with a direct current voltage; and (b) closing the switch at an instant of voltage peak of the ac power supply with the same polarity as the predetermined voltage.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

To prevent the problem of inrush current and transient overvoltage in shunt capacitor energization, a first preferred embodiment of a voltage peak switch closing method of the present invention is proposed. In the switching circuit shown in FIG. 1, the initial value of inductor current is zero before the capacitor is energized. By the first preferred embodiment of the method of the present invention, the capacitor is precharged to the peak value of the capacitor voltage in steady state so as to satisfy the condition (B). Then, the switch is closed at a positive or negative crest of the supply voltage sinewave (i.e., α=90° or 270°) so as to satisfy the condition (A). The peak value of the capacitor voltage in steady state can be expressed as $$V_c(0)=\pm \hat{V}_m =\pm[n^2/(n^2-1)]V_m \tag{6}$$

Figure 5A:
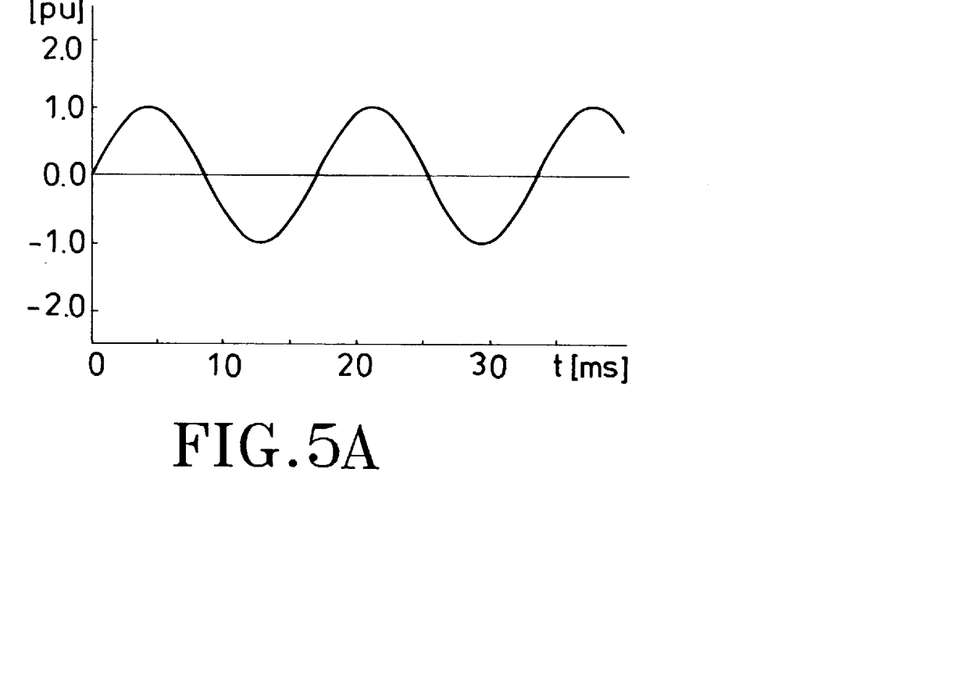
FIGS. 5A and 5B respectively illustrate waveforms of bus voltage and capacitor current when the switch is closed by the first preferred embodiment of a voltage peak switch closing method of the present invention.
Figure 5B:
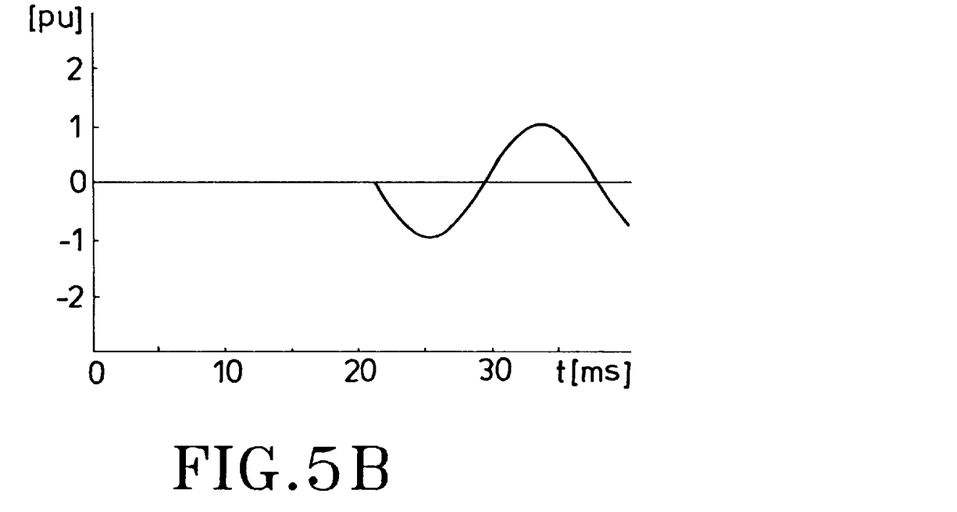

Both of the switching conditions (A and B) are satisfied so that the oscillatory components will disappear, as best shown in FIGS. 5A and 5B, which respectively illustrate waveforms of bus voltage and capacitor current when the switch is closed by the ideal transient-free switching method. The capacitor current and voltage consist of only the fundamental frequency component as shown in Table 1, which is illustrated in FIG. 4.

Figure 6:
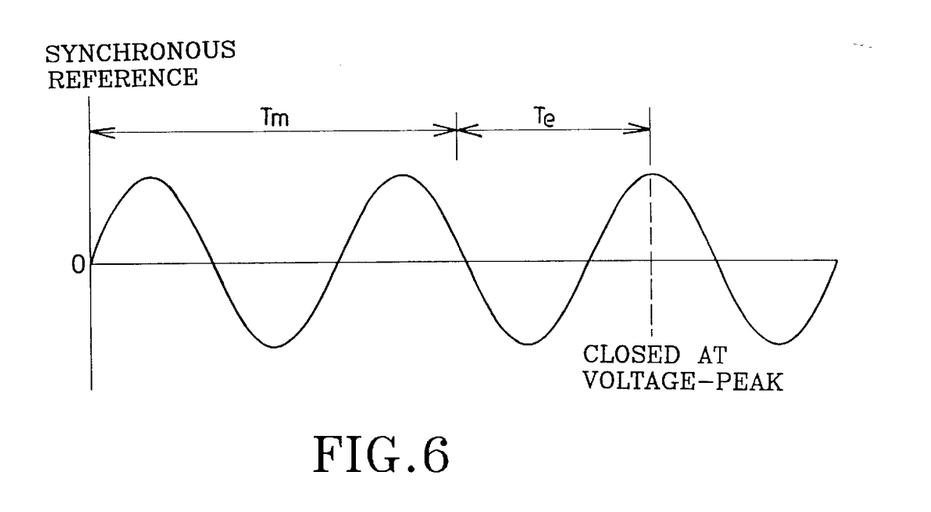
FIG. 6 illustrates the switch timing for the voltage peak switch closing method of the present invention in a single phase system.

As best shown in FIG. 6, the positive going zero crossing of the voltage is used as the synchronous reference. $T_m$ is the mechanical operation time which may vary due to the operation frequency, ambient temperature, and manufacture technique. $T_e$ is the electrical time which is adjusted to make the switch closing at voltage peak. The capacitor is precharged to the peak value ($V_m$) of the capacitor voltage in steady state. Then, the capacitor switch is closed at the instant of voltage peak of the ac supply voltage with the same polarity of precharged voltage. For example, the voltage and current equations of a capacitor with $V_c(0)=V_m$ energized at $\alpha=90°$ are shown in Table 1 of FIG. 4.

Figure 7:
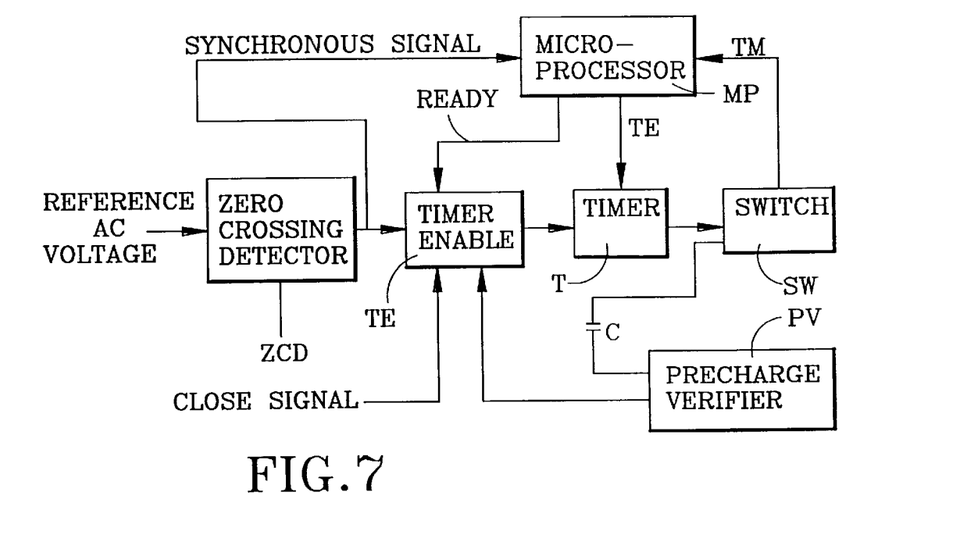
FIG. 7 is a schematic block diagram of a synchronous closing control circuit used in the present invention.

FIG. 7 shows a synchronous closing control circuit which is adapted to be used in the present invention. The control circuit includes a zero crossing detector (ZCD), a timer enable circuit (TE), a timer (T), a micro-processor (MP), a switch (SW) and a precharge verifier (PV).

The zero crossing detector (ZCD) is connected electrically to, for example, the inductor (L) shown in FIG. 1, and receives a reference AC voltage therefrom so as to detect the next positive going zero crossing of the reference AC voltage in order to provide a synchronous signal for the micro-processor (MP) and the time enable circuit (TE).

The micro-processor (MP) receives the synchronous signal and generates an electrical time ($T_e$) which is calculated according to the predicted point of the sinewave voltage, the frequency of the reference AC voltage and the mechanical time ($T_m$) of the switch (SW).

In addition to the synchronous signal, the timer enable circuit (TE) receives a close signal from an external commander (not shown), a signal from the precharge verifier (PV) that is connected electrically to the switch (SW) via, for example, the capacitor (C) shown in FIG. 1, and a ready signal from the micro-processor (MP). The timer enable circuit (TE) generates an enable signal for the timer (T). The timer (T) begins a time-out operation upon receiving the enable signal from the timer enable circuit (TE). At the end of the time-out operation, the switch (SW) is energized to be closed at the expected point of the sinewave voltage, that is, the capacitor switch is energized to be closed at the instant of voltage peak of the ac supply voltage with the same polarity as the precharged voltage.

In actual practice, it is difficult to guarantee perfect transient-free switching because n and $V_m$ in Equation (6) can vary during the period of non-conduction before the switch is closed. The supply system voltage and effective inductance may change in an unknown way, which in turn will change n.

Furthermore, for the embodiment as described above, the voltage across the shunt capacitor must be precharged to the predetermined level [see equation (6)]. The presence of inductance means that the capacitor must be overcharged beyond the voltage peak Vm by the magnification factor $n^2/(n^2-1)$. With low values of n, this factor can be substantial. Thus, a step-up transformer and rectifiers are necessary for the DC voltage precharge device which results in an increased cost for the switching device.

Figure 8A:
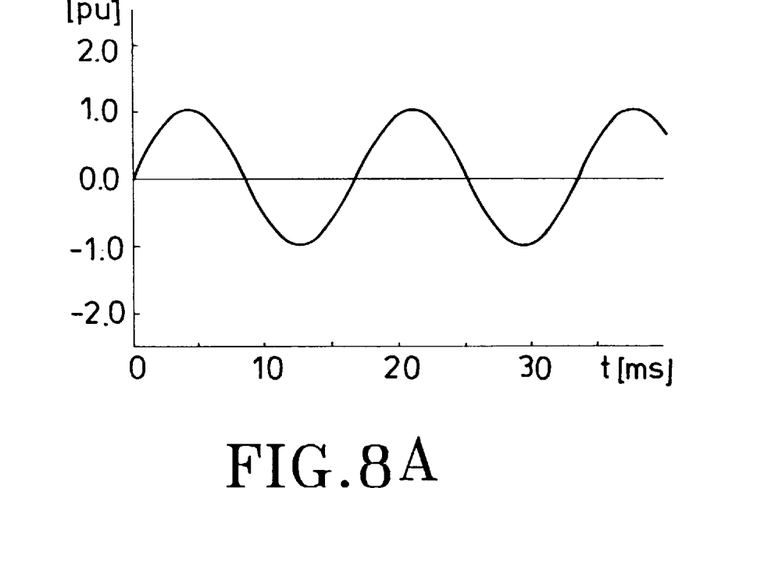
FIGS. 8A and 8B respectively illustrate waveforms of bus voltage and capacitor current when the switch is closed by the method of the present invention.
Figure 8B:
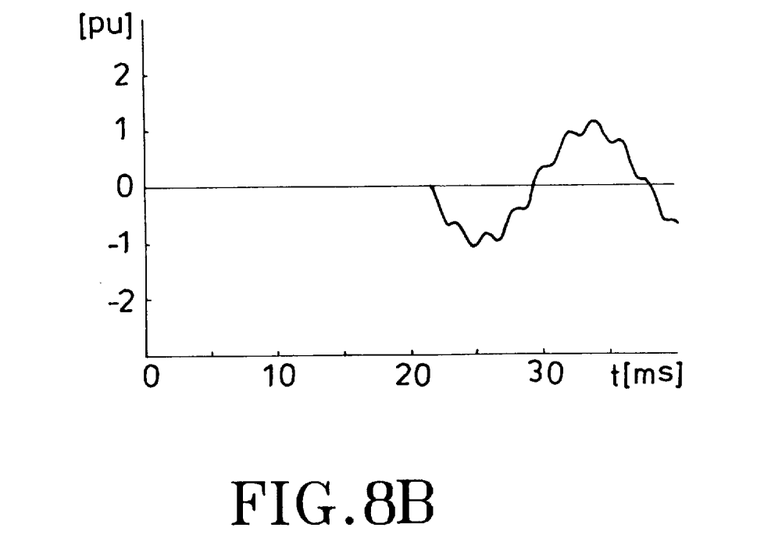

According to the second embodiment of the present invention, the capacitor is precharged to the level of the ac supply voltage peak ($V_m$) with direct current voltage. Referring to FIGS. 8A and 8B, by the method of this embodiment, although some transients still occur due to the capacitor precharged voltage being not equal to the capacitor peak voltage in steady state, it is much smaller than the conventional voltage zero switch closing method. Since the capacitor is precharged to the level of the ac supply voltage peak in this embodiment, no step-up transformer is required so that the cost of the switching device is reduced.

Figure 9:
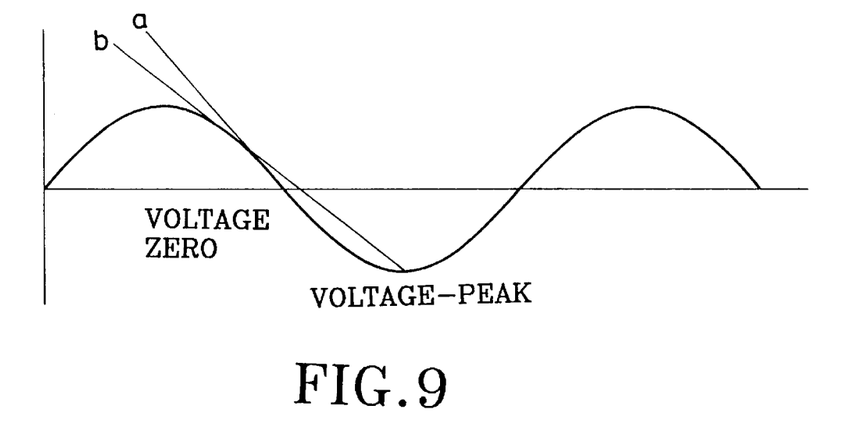
FIG. 9 illustrates the relationship between the switch contact velocity and dielectric gradient.

Referring now to FIG. 9, which illustrates the relationship between the switch contact velocity and dielectric characteristics that are combined to form dV/dt, a rate of dielectric gradient, lines (a) and (b) indicate the critical dielectric strength characteristics for making voltage zero closing and voltage peak closing occur. As the contact closing speed increases, the gradient of the dielectric strength characteristics line also increases. Below a critical gradient, the line always crosses the ac voltage envelope, but it does not cross the expected voltage point. Above this gradient, a condition for making the synchronous closing occurs.

The switch used in the voltage peak switch closing method of the present invention may be a traditional vacuum switch.

Since switches and circuit breakers are mechanical devices with complex mechanisms, the speed of operation is not completely consistent. A typical deviation of ±0.2 mS is measured. This deviation is due to the small change with temperature and the inherent mechanical consistency of the switch.

In order to analyze the effect of the deviation time on the conventional voltage zero switch closing method and the voltage peak switch closing method of the present invention, the switching capacitor current equation (3) and voltage equation (4) are differentiated by the voltage phase $\alpha$.

The current differential equation is represented as follows:

$$di(t)/d\alpha = -\hat{I}_m \sin(\omega t + \alpha) + \hat{I}_m \sin \alpha \cos \omega_n t + n \hat{I}_m \cos \alpha \sin \omega_n t \quad (7)$$

The last term of equation (7) is dominantly the major quantity of oscillatory component of the inrush current. Thus, we can obtain $$|di(t)/d\alpha|_{\alpha=0°+\Delta\alpha} > |di(t)/d\alpha|_{\alpha=90°+\Delta\alpha}, \text{ for } \Delta\alpha<90°$$

and $$|dv(t)/d\alpha|_{\alpha=0°+\Delta\alpha} > |dv(t)/d\alpha|_{\alpha=90°+\Delta\alpha}, \text{ for } \Delta\alpha<90°$$

where $\alpha$ is the voltage phase shift which is proportional to the deviation time. The subscript $\alpha=0°+\Delta\alpha$ ($\alpha=90°+\Delta\alpha$) represents that the switch is closed at voltage zero (or voltage-peak) with deviation time.

Figure 10:
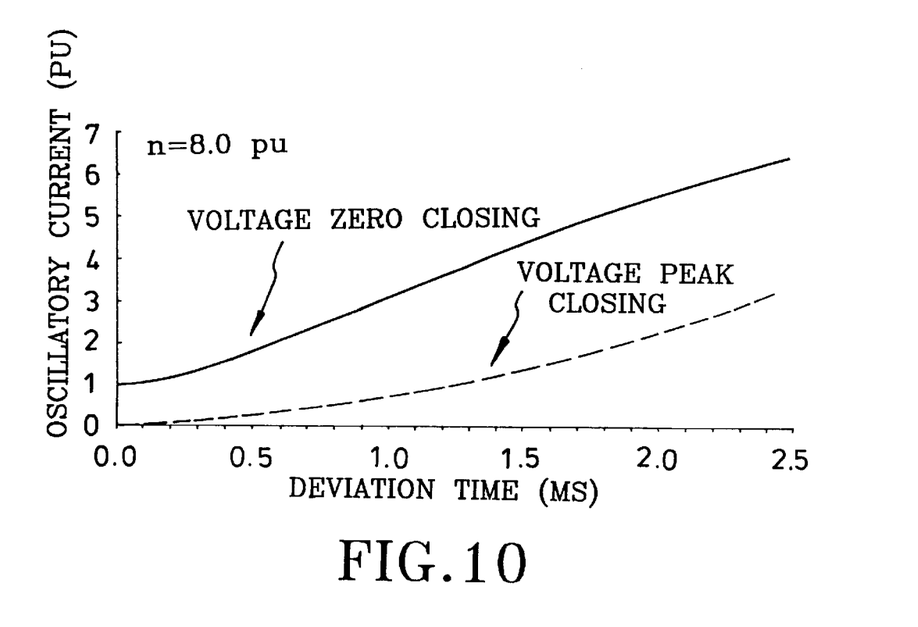
FIG. 10 is a graph of oscillatory current vs deviation time for the voltage peak closing method of the present invention.

The magnitudes of the high frequency oscillatory current and voltage are amplified due to the deviation of closing time. As shown in FIG. 10, amplification is more significant when the switch closed by the conventional voltage zero switch closing method than by the voltage peak switch closing method of the present invention for $\Delta\alpha<90°$.

Referring to FIG. 10, the voltage peak closing method has the longest allowable time deviation for a given inrush current limit. For 3 pu oscillatory current limit performance, the maximum time deviation for a voltage peak closing method is 2.3 mS, while that for the conventional voltage zero switch closing method is 0.9 mS. Even though the switch is closed exactly at voltage zero point, it still brings a 1.0 pu high frequency oscillatory component. For 1.0 pu oscillatory current limit performance, the maximum time deviation for the voltage peak switch closing method of the present invention is 1.2 mS.

Figure 11A:
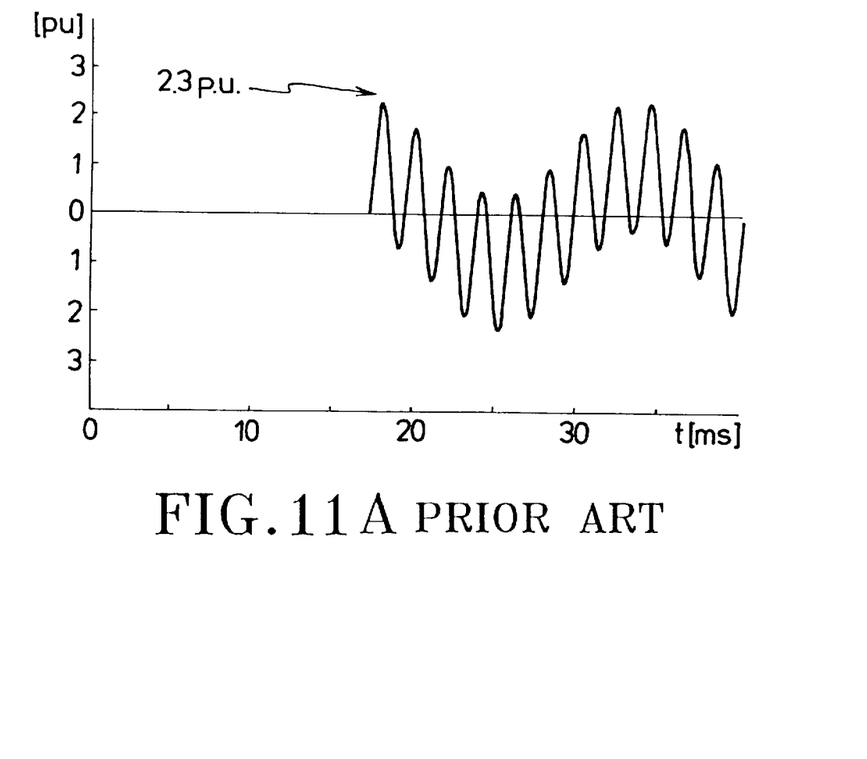
FIGS. 11A and 11B are graphs illustrating simulation results of the effect of deviation time for the conventional voltage zero switch closing method and the voltage peak switch closing method of the present invention.
Figure 11B:
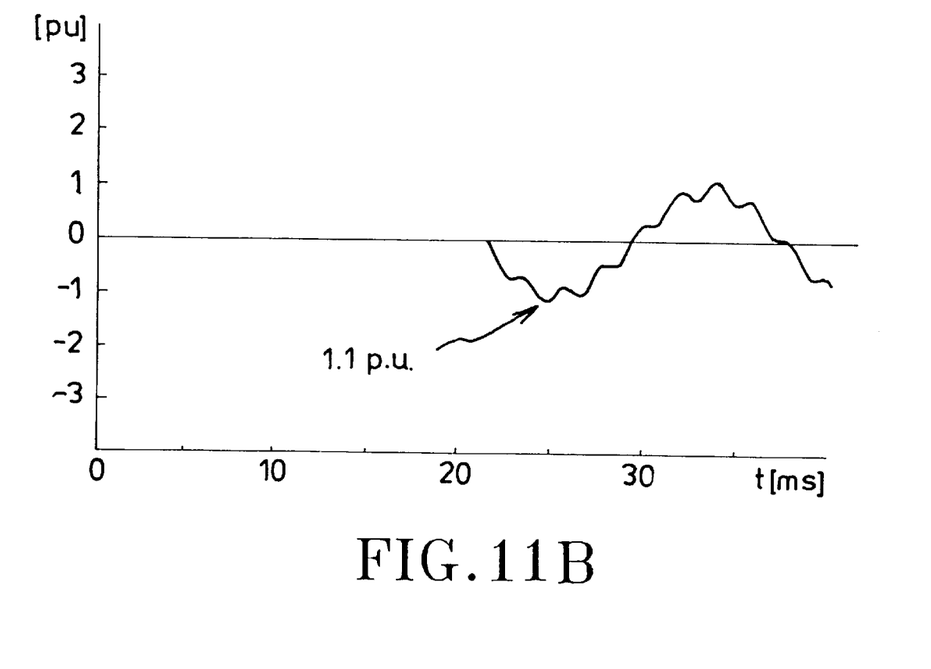
Figure 12A:
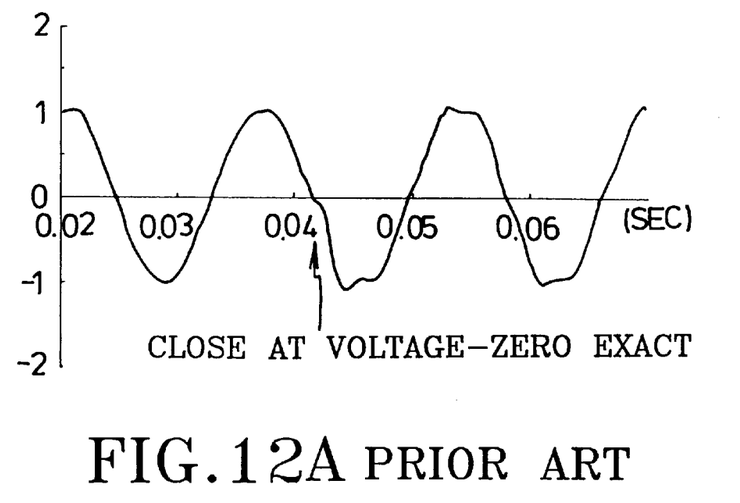
FIGS. 12A and 12B respectively illustrate responses of bus voltage and capacitor current when the capacitor is energized in one condition by the conventional voltage zero switch closing method.
Figure 12B:
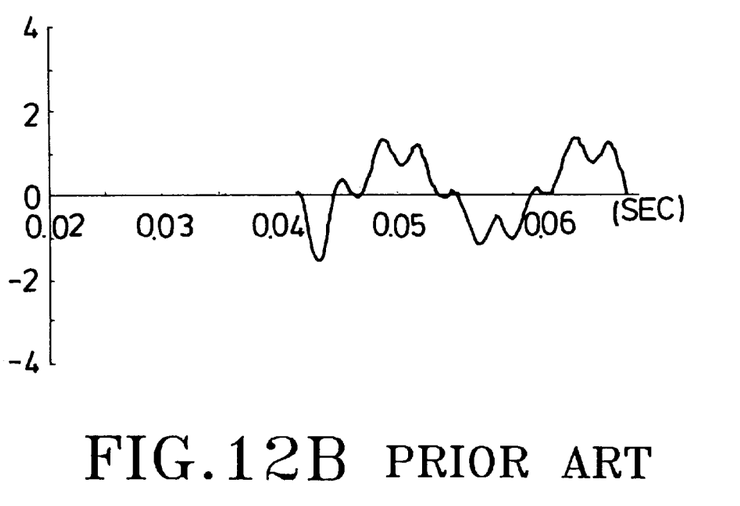

A simulation example illustrates the response of the transient current when the switch is closed by the voltage peak switch closing method of the present invention and by the conventional voltage zero switch closing method at 0.3 mS late, respectively. The current peak reaches 2.3 pu in FIG. 11A and 1.1 pu in FIG. 11B. With long deviation time, the inrush current will be amplified. It is apparent that the magnitude of the inrush current produced by the voltage peak switch closing method of the present invention is lower than that produced by the conventional voltage zero switch closing method.

A simple transient switching test has been implemented in a laboratory. A small capacitor (10 $\mu$F) was energized by a commerical 60 Hz, 110V voltage source. The inductance of the series reactor is 20 mH. The bus voltage and capacitor current were recorded by a digital oscilloscope (HP 54503A). The switching circuit is similar to that shown in FIG. 1 but it includes a resistor (R=0.6$\Omega$) for current measurement. Source impedance was not recorded.

Figure 13A:
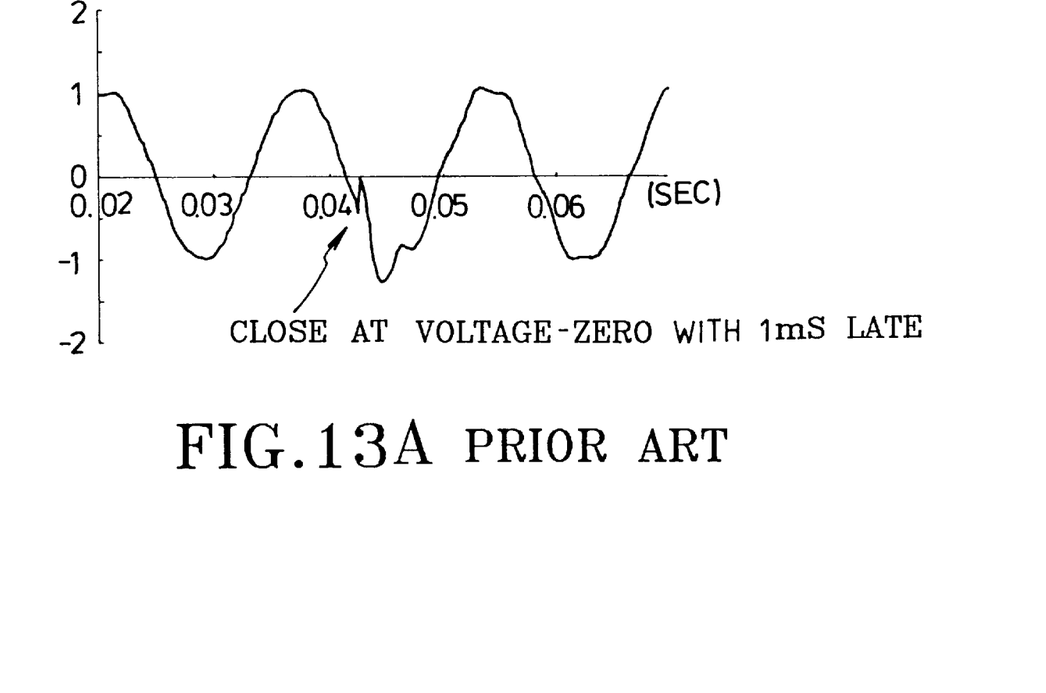
FIGS. 13A and 13B respectively illustrate responses of bus voltage and capacitor current when the capacitor is energized in another condition by the conventional voltage zero switch closing method.
Figure 13B:
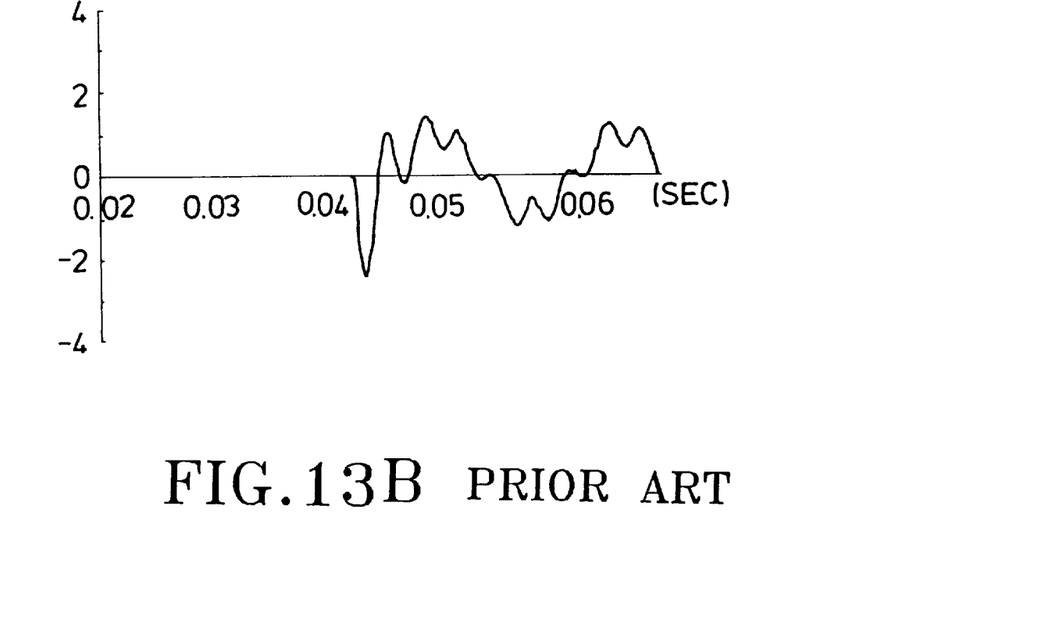

There are a lot of harmonics near the laboratory so that the voltage and current are not pure sinusoidal waveforms in steady state. Referring to FIGS. 12A, 12B, 13A and 13B, the transient voltage and current were amplified when the discharged capacitor was energized by the conventional voltage switch zero closing method at the exact voltage-zero point (FIGS. 12A and 12B) and 1 mS late (FIGS. 13A and 13B).

Figure 14A:
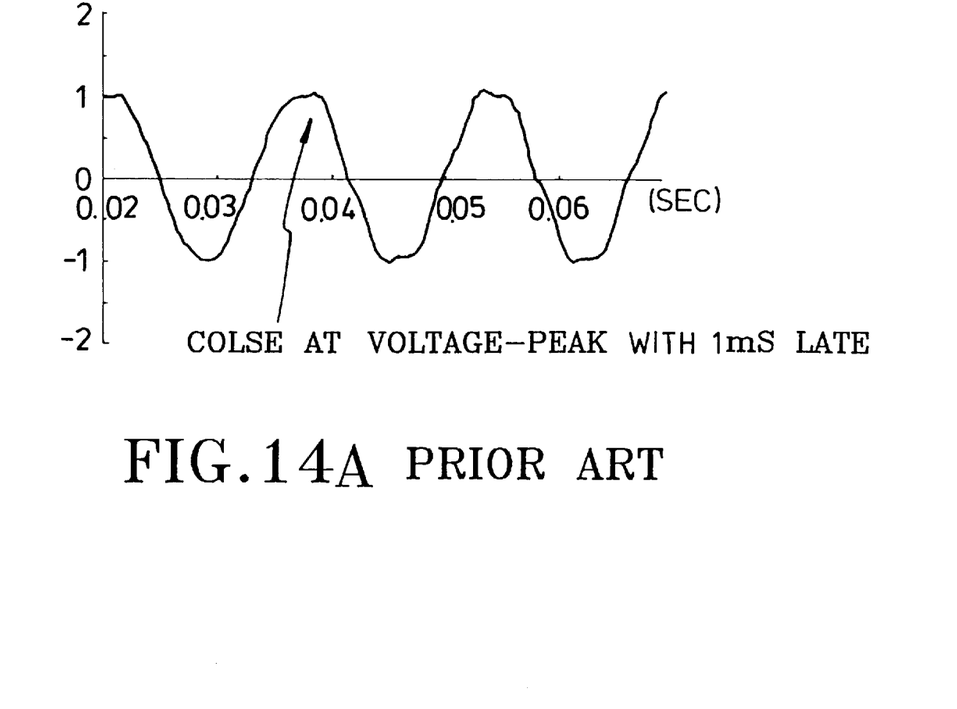
FIGS. 14A and 14B respectively illustrate responses of bus voltage and capacitor current when the capacitor is energized in one condition by the method of the present invention.
Figure 14B:
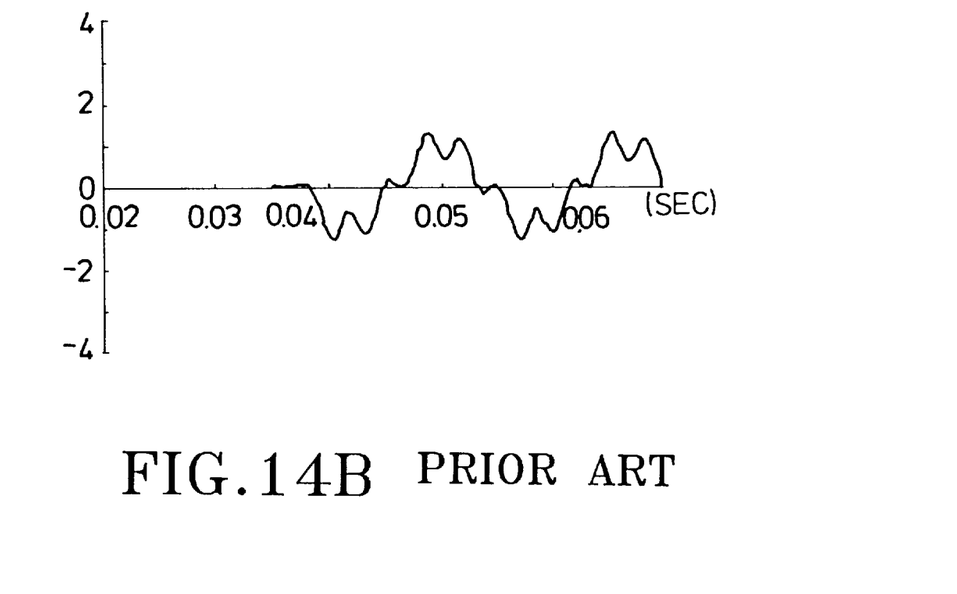

Referring to FIGS. 14A and 14B, for the voltage peak switch closing method of the present invention, the capacitor was precharged to a predicted voltage level, and is then energized at ac supply voltage-peak point and 1 mS late. The transient voltage and current are not amplified obviously. The capacitor operates into steady state immediately when it is switched on. This result illustrates that the voltage peak switch closing method for shunt capacitor energization of the present invention is better than the conventional voltage zero switch closing method for shunt capacitor energization.

It should be noted that, the voltage peak switch closing method of the present invention is applicable for shunt capacitors energization in a three-phase system as described below.

Figure 15A:
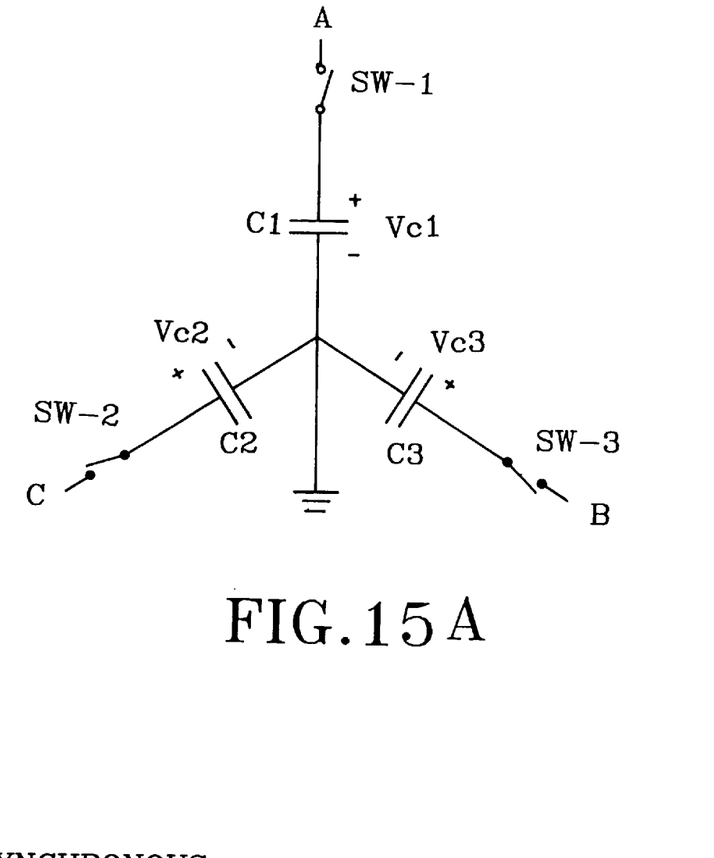
FIG. 15A is a schematic circuit diagram illustrating another capacitor switching circuit in which three capacitors are connected in a grounded Y connection.

FIG. 15A shows three capacitors C1,C2,C3 in a three-phase system. The capacitors C1,C2,C3 of this embodiment are connected in a grounded Y connection so that the energization of the capacitors C1,C2,C3 can be dealt with as three single phase systems as described above.

Figure 15B:
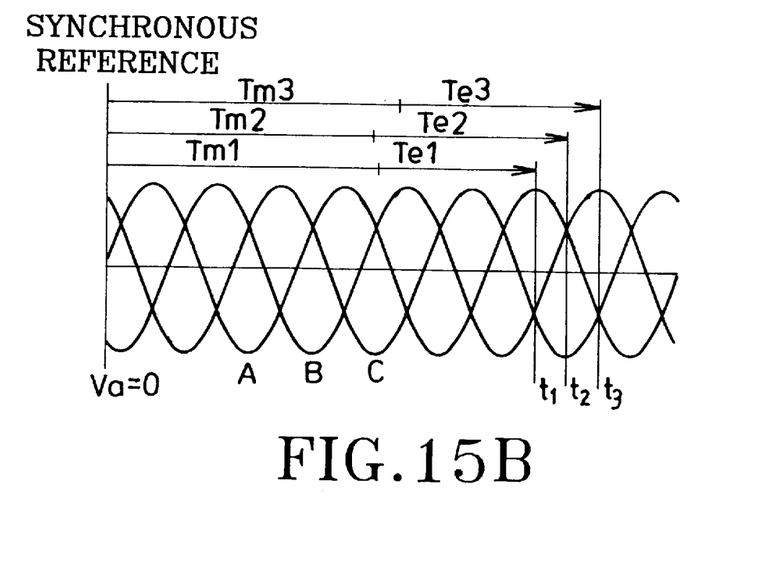
FIG. 15B illustrates the switch timing for the voltage peak switch closing method of the present invention in the three phase system shown in FIG. 15A.

As best shown in FIG. 15B, the next positive going zero crossing of the voltage phase A is used as the synchronous reference. In order to close the three switches as soon as possible without any transients, the time interval of $\pi/3\omega$ among t1,t2 and t3 is necessary. The closing time (t1) of the switch (SW-1) is chosen at the instant of the voltage peak of the voltage phase A. Therefore, the precharged voltage level of the capacitor (C1) is $V_c1=V_m$. Similarly, the precharged voltage levels of the two capacitors (C2 and C3) are decided by the relative closing times (t2 and t3) to be $V_c2=-V_m$ and $V_c3=V_m$.

Figure 16A:
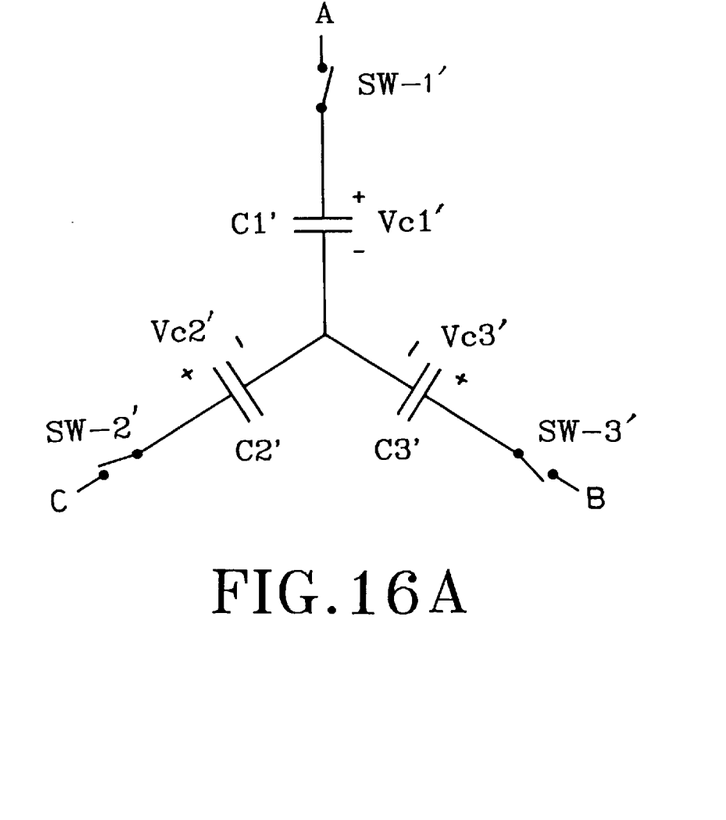
FIG. 16A is a schematic circuit diagram illustrating another capacitor switching circuit in which three capacitors are connected in an ungrounded Y connection.

Referring now to FIG. 16A, there is shown three capacitors (C1',C2',C3') which are connected in an ungrounded Y connection in a three-phase system. In this embodiment, the precharged voltage levels of any two of the three capacitors (C1',C2',C3') must be chosen to be the line-to-line voltage.

Figure 16B:
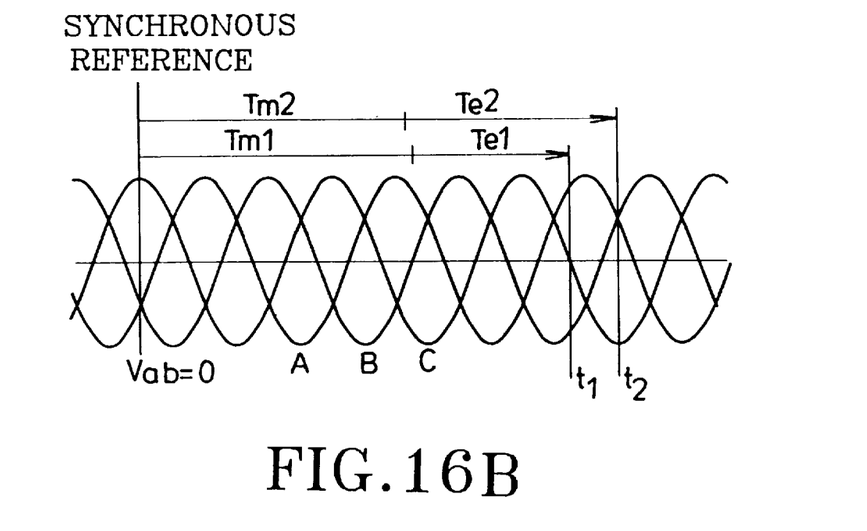
FIG. 16B illustrates the switch timing for the voltage peak switch closing method of the present invention in the three phase system shown in FIG. 16A.

As shown in FIG. 16B, the next positive going zero crossing of the line-to-line voltage between phase A and phase B is used as the synchronous reference. In order to close the three switches (SW-1',SW-2',SW-3') as fast as possible without any transients, the time interval of $\pi/2\omega$ between (t1) and (t2) is necessary. The closing time (t1) of the two switches (SW-1' and SW-3') is chosen at the instant of the voltage peak of the line-to-line voltage between phase A and phase B. Therefore, the precharged voltage levels of the two capacitors (C1' and C3') are respectively $V_c1'=0.866V_m$ and $V_c3'=-0.866V_m$. The other closing time (t2) for the switch (SW-2') is chosen at the instant of the voltage peak of the voltage phase C so that the precharged voltage level of the capacitor (C2) is $V_c2'=-1.5V_m$.

Figure 17A:
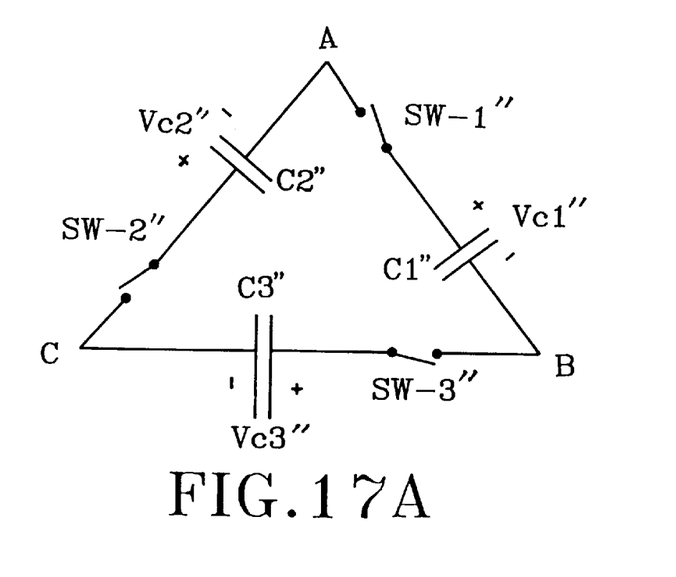
FIG. 17A is a schematic circuit diagram illustrating another capacitor switching circuit in which three capacitors are connected in a delta connection.
Figure 17B:
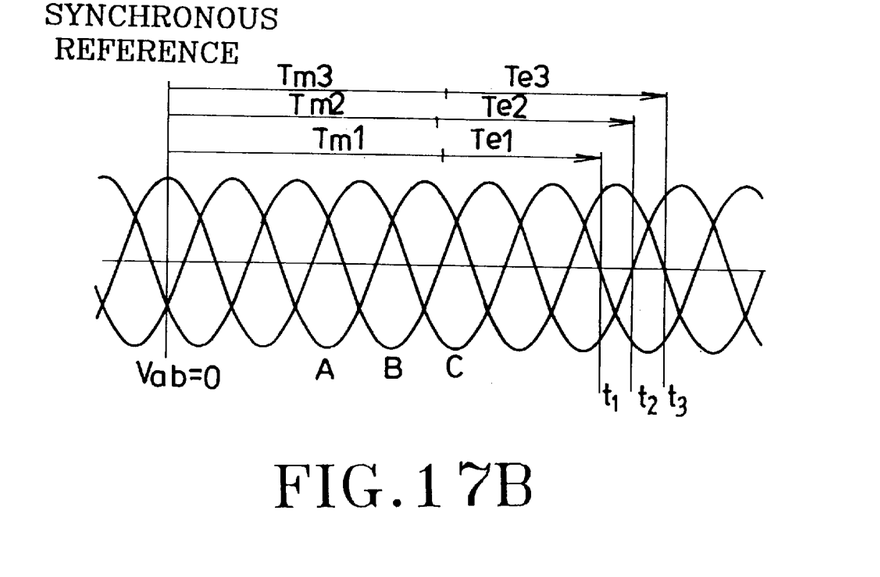
FIG. 17B illustrates the switch timing for the voltage peak switch closing method of the present invention in the three phase system shown in FIG. 17A.

FIGS. 17A and 17B respectively show three capacitors (C1",C2",C3") which are connected in a delta connection in a three-phase system and the switch timing of the capacitors (C1",C2",C3"). The next positive going zero crossing of the line-to-line voltage between phase A and phase B is used as the synchronous reference. In order to close the three switches (SW-1",SW-2",SW-3") as soon as possible without any transients, the time interval of $\pi/3\omega$ among t1,t2 and t3 is necessary. The closing time (t1) of the switch (SW-1") is chosen at the instant of the voltage peak of the line-to-line voltage between phase A and phase B. Therefore, the precharged voltage level of the capacitor (C1) is $V_c1"=1.732V_m$. Similarly, the precharged voltage levels of the two capacitors (C2 and C3) are $V_c2"=-1.732V_m$ and $V_c3"=1.732V_m$.

From the foregoing, it is apparent that the voltage peak switch closing method for shunt capacitor energization according to the present invention is superior to the conventional voltage zero switch closing method in switch's dielectric characteristics and allowable switching deviation time because the voltage changing rate is maximum at voltage zero and minimum at voltage peak.

Furthermore, the voltage peak switch closing method for shunt capacitor energization offers an effective design to reduce the switching transients during capacitor bank energization. The reduction of transient inrush current and overvoltage improves the network power quality, reduces the stresses on the switching equipment and extends the capacitor life. While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A voltage peak switch closing method for energizing a shunt capacitor in a circuit that includes an ac power supply and a switch, comprising:

(a) precharging said shunt capacitor to a predetermined voltage with a direct current voltage; and (b) closing said switch at an instant of voltage peak of said ac power supply with the same polarity as the predetermined voltage, wherein said predetermined voltage is equal to the voltage peak of said ac power supply.

2. A voltage peak switch closing method for energizing a shunt capacitor in a circuit that includes an ac power supply and a switch, comprising:

(a) precharging said shunt capacitor to a predetermined voltage with a direct current voltage; and (b) closing said switch at an instant of voltage peak of said ac power supply with the same polarity as the predetermined voltage, wherein-said predetermined voltage is equal to a peak voltage of said shunt capacitor in steady state.

3. A voltage peak switch closing method for energizing shunt capacitors having positive terminals and grounded negative terminals in a three-phase power system that includes an ac power supply and a plurality of switches, each of the switches being connected electrically to the positive terminal of a respective one of the shunt capacitors, said method comprising:

(a) precharging each of said shunt capacitors to a predetermined voltage with a direct current voltage; and (b) closing each of said switches at an instant of voltage peak of said ac power supply with the same polarity as the predetermined voltage.

4. A voltage peak switch closing method as claimed in claim 3, wherein said predetermined voltage is equal to the voltage peak of said ac power supply.

5. A voltage peak switch closing method as claimed in claim 3, wherein said predetermined voltage is equal to a peak voltage of said shunt capacitor in steady state.

6. A voltage peak switch closing method for energizing shunt capacitors having positive and negative terminals in a three-phase power system that includes a plurality of switches, each of the switches being connected electrically to the positive terminal of a respective one of the shunt capacitors, the negative terminals of the shunt capacitors being connected to each other, said method comprising:

(a) precharging any two of said shunt capacitors to a first predetermined voltage with a first direct current voltage;

(b) precharging the remaining one of said shunt capacitors to a second predetermined voltage with a second direct current voltage;

(c) closing said switches corresponding to said any two of said shunt capacitors at an instant of voltage peak of a line-to-line voltage between said any two of said shunt capacitors with the same polarity as the first predetermined voltage; and (d) closing said switch corresponding to said remaining one of said shunt capacitors at an instant of voltage peak of said remaining one of said shunt capacitors with the same polarity as the second predetermined voltage.

7. A voltage peak switch closing method as claimed in claim 6, wherein said first predetermined voltage is equal to ($\sqrt{3}/2$) times a peak voltage of said shunt capacitor in steady state.

8. A voltage peak switch closing method as claimed in claim 6, wherein said second predetermined voltage is equal to (3/2) times a peak voltage of said shunt capacitor in steady state.

9. A voltage peak switch closing method for energizing shunt capacitors having positive and negative terminals in a three-phase power system that includes a plurality of switches, each of the switches being connected electrically to the positive terminal of a respective one of the shunt capacitors, the negative terminals of the shunt capacitors being connected to the switch corresponding to an adjacent one of the shunt capacitors, said method comprising:

(a) precharging each of said shunt capacitors to a predetermined voltage with a direct current voltage; and (b) closing each of said switches at an instant of voltage peak of a line-to-line voltage between the corresponding shunt capacitor and an adjacent one of the shunt capacitors with the same polarity as the predetermined voltage.

10. A voltage peak switch closing method as claimed in claim 9, wherein said predetermined voltage is equal to ($\sqrt{3}$) times a peak voltage of said shunt capacitor in steady state.

* * * * *